US010298972B2

(12) United States Patent
Oh

(10) Patent No.: US 10,298,972 B2
(45) Date of Patent: May 21, 2019

(54) SOURCE DEVICE, CONTENT PROVIDING METHOD USING SOURCE DEVICE, SINK DEVICE AND CONTROLLING METHOD OF THE SINK DEVICE

(71) Applicant: SAMSUNG ELECTRONICS CO., LTD., Suwon-si (KR)

(72) Inventor: Sung-bo Oh, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/721,103

(22) Filed: Sep. 29, 2017

(65) Prior Publication Data
US 2018/0027267 A1    Jan. 25, 2018

Related U.S. Application Data

(63) Continuation of application No. 14/153,578, filed on Jan. 13, 2014, now Pat. No. 9,848,218.

(30) Foreign Application Priority Data

Apr. 17, 2013 (KR) .................. 10-2013-0042464

(51) Int. Cl.
*H04N 7/167* (2011.01)
*H04N 21/2347* (2011.01)
(Continued)

(52) U.S. Cl.
CPC ......... *H04N 21/2347* (2013.01); *G06F 21/10* (2013.01); *G09G 5/006* (2013.01);
(Continued)

(58) Field of Classification Search
CPC ...... H04N 5/775; H04N 7/22; H04N 21/2347; H04N 21/43622; H04N 21/4367;
(Continued)

(56) References Cited

U.S. PATENT DOCUMENTS 8,208,786 B2   6/2012  Tan et al.
8,370,536 B2   2/2013  Bohm
(Continued)

FOREIGN PATENT DOCUMENTS

CN   103974091 A   8/2014
EP     2302633 A1   3/2011
(Continued)

OTHER PUBLICATIONS

Digital Content Protection LLC, 'High-bandwidth Digital Content Protection System Interface Independent Adaptation Revision 2.2', Oct. 16, 2012.*
(Continued)

*Primary Examiner* — Abiy Getachew
(74) *Attorney, Agent, or Firm* — Sughrue Mion, PLLC

(57) ABSTRACT

A source device for transmitting content to a sink device is provided. The source device may include an interface configured to perform high-bandwidth digital content protection (HDCP) authentication with the sink device, and a controller configured to determine an HDCP version supported by the sink device, convert the content so as to be encrypted in the HDCP version supported by the sink device in response to a determination that another HDCP version applied to the content is not supported by the sink device, encrypt the converted content in the HDCP version supported by the sink device, and control the interface to transmit the content to the sink device.

12 Claims, 7 Drawing Sheets

Related U.S. Application Data

(60) Provisional application No. 61/757,361, filed on Jan. 28, 2013.

(51) Int. Cl.
| | | |
|---|---|---|
| *H04L 29/06* | (2006.01) | |
| *H04N 21/436* | (2011.01) | |
| *H04N 21/4367* | (2011.01) | |
| *H04N 21/4408* | (2011.01) | |
| *G09G 5/00* | (2006.01) | |
| *G06F 21/10* | (2013.01) | |
| *H04N 21/4402* | (2011.01) | |

(52) U.S. Cl.
CPC ..... *H04L 63/0428* (2013.01); *H04N 21/4367* (2013.01); *H04N 21/43622* (2013.01); *H04N 21/4408* (2013.01); *H04N 21/440263* (2013.01); *G09G 2340/0407* (2013.01); *G09G 2358/00* (2013.01); *G09G 2370/047* (2013.01); *G09G 2370/12* (2013.01)

(58) Field of Classification Search
CPC ....... H04N 21/440263; H04N 21/4408; H04N 21/4325; H04N 21/43615; H04N 21/43632; H04N 21/6118; H04N 9/641; G06F 21/10; G09G 2340/0407; G09G 2358/00; G09G 2370/047; G09G 2370/12; G09G 5/006; H04L 63/0428
See application file for complete search history.

(56) References Cited

U.S. PATENT DOCUMENTS

| | | | |
|---|---|---|---|
| 9,848,218 B2 | 12/2017 | Oh | |
| 2005/0027993 A1 | 2/2005 | Yanagisawa | |
| 2005/0204163 A1 | 9/2005 | Alkove et al. | |
| 2006/0071920 A1 | 4/2006 | Ishimatsu et al. | |
| 2007/0074241 A1 | 3/2007 | Yeo | |
| 2007/0133673 A1 | 6/2007 | Imaizumi | |
| 2008/0101467 A1* | 5/2008 | MacMullan | G06F 3/14 375/240.12 |
| 2008/0212940 A1 | 9/2008 | Tan et al. | |
| 2009/0251605 A1 | 10/2009 | Hsiao | |
| 2010/0271486 A1 | 10/2010 | Bohm | |
| 2011/0093722 A1 | 4/2011 | Devanand | |
| 2011/0110645 A1 | 5/2011 | Yanase et al. | |
| 2012/0023240 A1 | 1/2012 | Kwon et al. | |
| 2012/0148048 A1* | 6/2012 | Oh | H04N 7/1675 380/277 |
| 2012/0300084 A1 | 11/2012 | Oh | |
| 2014/0211941 A1 | 7/2014 | Oh | |
| 2018/0027267 A1 | 1/2018 | Oh | |

FOREIGN PATENT DOCUMENTS

| | | |
|---|---|---|
| JP | 2005-51558 A | 2/2005 |
| JP | 2006-108961 A | 4/2006 |
| JP | 2007-288247 A | 11/2007 |
| JP | 2010-41091 A | 2/2010 |
| KR | 10-1099311 B1 | 12/2011 |
| RU | 2 319 225 C1 | 3/2008 |

OTHER PUBLICATIONS

Communication dated Dec. 20, 2016 issued by the European Patent Office in counterpart European Patent Application No. 14151391.1.
Communication dated May 2, 2017 issued by the Russian Patent Office in counterpart Russian Patent Application No. 2015136433.
Hitachi Ltd. et al; "High-Definition Multimedia Interface Specification Version 1.4"; Gangi Engineering Microprocessor & Video Product Design Service; Jun. 5, 2009; 426 pgs. total.
Communication dated Jun. 15, 2016 issued by the Mexican Patent Office in counterpart Mexican Patent Application No. MX/a/2015/009111.
Communication dated Dec. 3, 2014 issued by European Patent Office in counterpart European Patent Application No. 14151391.1.
Communication, dated Apr. 15, 2014, issued by the Korean Intellectual Property Office in counterpart Korean Patent Application No. 10-2013-0042464.
International Search Report, dated May 26, 2014, issued by the International Searching Authority in counterpart International Application No. PCT/KR2014/000820.
Written Opinion, dated May 26, 2014, issued by the International Searching Authority in counterpart International Application No. PCT/KR2014/000820.
"High-bandwidth Digital Content Protection System Interface Independent Adaptation Revision 2.2," Digital Content Protection, LLC, Oct. 16, 2012, pp. 1-78.
Communication dated Feb. 23, 2018 by the State Intellectual Property Office of P.R. China in counterpart Chinese Patent Application No. 201710505950.3.
Communication issued by the Russian Patent Office dated Aug. 31, 2017 in counterpart Russian Patent Application No. 2015136433.
Communication issued by the State Intellectual Property Office of P.R. China dated Oct. 9, 2017 in counterpart Chinese Patent Application No. 201410040084.1.
Communication issued by the Japanese Patent Office dated Oct. 24, 2017 in counterpart Japanese Patent Application No. 2014-010982.
Communication issued by the European Patent Office dated Jul. 25, 2017 in counterpart European Patent Application No. 14 151 391.1.
Communication dated Jan. 15, 2019 issued by the Indian Patent Office in counterpart Indian Patent Application No. 2234/MUMNP/2015.
Communication dated Jan. 11, 2019 issued by the State Intellectual Property Office of P.R. China in counterpart Chinese Patent Application No. 201710505950.3.
Communication dated Feb. 7, 2019 issued by the European Patent office in counterpart European Patent Application No. 14151391.1.

* cited by examiner

SOURCE DEVICE, CONTENT PROVIDING METHOD USING SOURCE DEVICE, SINK DEVICE AND CONTROLLING METHOD OF THE SINK DEVICE

CROSS-REFERENCE TO RELATED APPLICATIONS

This application is a continuation of U.S. patent application Ser. No. 14/153,578 filed on Jan. 13, 2014 which claims priority from U.S. Provisional Patent Application No. 61/757,361, filed on Jan. 28, 2013 in the United States Patent and Trademark Office and Korean Patent Application No. 10-2013-0042464, filed on Apr. 17, 2013 in the Korean Intellectual Property Office, the disclosures of which are incorporated herein by reference in their entirety.

BACKGROUND

1. Field

Devices and methods consistent with exemplary embodiments relate to a source device, a content providing method using the source device, a sink device and a controlling method of the sink device, and more specifically, to a source device connected through High-Definition Multimedia Interface (HDMI) and performing high-bandwidth digital content protection (HDCP) authentication, a content providing method using the same, and a sink device and a controlling method thereof.

2. Description of the Related Art

Recording mediums for recording and playing back high quality image and audio data, such as DVDs and Blu-ray discs, are widely used. Further, various display apparatuses which can display high quality image and audio data are widely distributed.

Accordingly, the use of digital TV in conjunction with various DVD and Blu-ray players that record or play content from respective recording mediums, has increased. Further the high-speed multimedia interface (HDMI) may be used as a digital interface to transmit data between such devices.

Devices that support HDMI may provide high resolution image and audio, and may support high-bandwidth digital content protection (HDCP) to prevent copying of content.

Further, recent content providers have shown some movement in adopting HDCP version 2.2 by classifying high resolution content as premium content when providing high resolution content such as 4 k content and 3D content in full HD. Accordingly, related display apparatuses which only support less than HDCP version 2.2 have an issue in that compatibility with high resolution content, to which HDCP version 2.2 is applied, cannot be obtained.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to an aspect of an exemplary embodiment, there is provided a source device for transmitting content to a sink device, the source device may include an interface configured to perform high-bandwidth digital content protection (HDCP) authentication with the sink device, and a controller configured to determine an HDCP version supported by the sink device, convert the content so as to be encrypted in the HDCP version supported by the sink device in response to a determination that another HDCP version applied to the content is not supported by the sink device, encrypt the converted content in the HDCP version supported by the sink device, and control the interface to transmit the content to the sink device.

The content may be premium content required to be encrypted in a first HDCP version, and the HDCP version supported by the sink device may be a second HDCP version which is lower than the first HDCP version.

The controller may convert the content so as to be encrypted in the HDCP version supported by the sink device by reducing resolution of the content through downscaling.

The controller may determine the HDCP version supported by the sink device based on whether HDCP authentication can be performed with the sink device according to a method respectively defined in the HDCP version supported by the sink device and the HDCP version applied to the content.

The controller may request transmitting information regarding the HDCP version previously stored in the sink device, and wherein the controller may determine the HDCP version supported by the sink device based on the received information regarding the HDCP version from the sink device.

The controller may encrypt the content in the HDCP version applied to the content and transmits the content to the sink device in response to a determination that the HDCP version applied to the content is supported by the sink device.

The controller may control the sink device to output a message indicating that the content is converted in response to the converted content being transmitted to the sink device.

According to an aspect of another exemplary embodiment, there is provided a sink device for outputting content provided from a source device, the sink device may include an interface configured to perform high-bandwidth digital content protection (HDCP)authentication with the source device, and a controller configured to control the interface to transmit previously stored information regarding a HDCP version supported by the sink device to the source device in response to a request, from the source device, for information regarding the HDCP version supported by the sink device being received.

A storage may be configured to store information regarding the HDCP version supported by the sink device in an extended display identification data (EDID) format.

According to an aspect of another exemplary embodiment, there is provided a method of transmitting content from a source device to a sink device, the method may include determining a high-bandwidth digital content protection (HDCP)version supported by the sink device, converting the content so as to be encrypted in the HDCP version supported by the sink device in response to a determination that another HDCP version applied to the content is not supported by the sink device, and encrypting the converted content in the HDCP version supported by the sink device and transmitting to the sink device.

The content may be premium content required to be encrypted in a first HDCP version, and the HDCP version supported by the sink device may be a second HDCP version which is lower than the first HDCP version.

The converting may include converting the content so as to be encrypted in the HDCP version supported by the sink device by reducing resolution of the content through downscaling.

The determining may include determining the HDCP version supported by the sink device based on whether HDCP authentication can be performed with the sink device according to a method respectively defined in the HDCP version supported by the sink device and the HDCP version applied to the content.

The determining may include requesting transmission of previously stored information regarding the HDCP version stored on the sink device, and determining the HDCP version supported by the sink device based on the received information regarding the HDCP version from the sink device.

The method may further include encrypting the content in the HDCP version applied to the content and transmitting the content to the sink device in response to a determination that the HDCP version applied to the content is supported by the sink device.

The method may further include controlling the sink device to output a message indicating that the content is converted in response to the converted content being transmitted to the sink device.

According to an aspect of another exemplary embodiment, there is provided a method of controlling a sink device for outputting content provided from a source device, the method may include receiving a request for information regarding a high-bandwidth digital content protection (HDCP)version supported by the sink device from the source device, and transmitting previously stored information regarding the HDCP version supported by the sink device to the source device in response to the request for transmitting information regarding the HDCP version being received.

The sink device may store information regarding the HDCP version supported by the sink device in an extended display identification data (EDID) format.

BRIEF DESCRIPTION OF THE DRAWINGS

The above and/or other aspects of the present inventive concept will be more apparent by describing certain exemplary embodiments with reference to the accompanying drawings, in which.

DETAILED DESCRIPTION OF EXEMPLARY EMBODIMENTS

Figure 1:
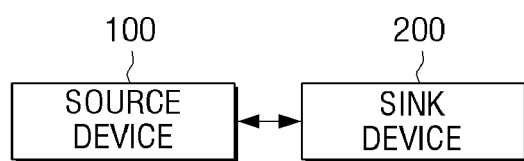
FIG. 1 is a view provided to explain a content providing system according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail because they may obscure one or more exemplary embodiments with unnecessary detail.

Referring to the attached drawings, one or more exemplary embodiments will be described in detail below.

FIG. 1 is a view provided to explain a content providing system according to an exemplary embodiment. Referring to FIG. 1, the content providing system may include a source device 100 and a sink device 200.

Herein, the source device 100 may be implemented as various types of electronic devices that can provide content to the sink device 200, such as set-top box, DVD player, Blu-ray disc player, PC, or game machine. The sink device 200 may be implemented as various types of electronic devices that can output content provided from the source device 100, such as a television (TV) and personal computer (PC).

Further, the source device 100 and the sink device 200 may connect to each other through a high-speed multimedia interface (HDMI) and perform communication.

The source device 100 and the sink device 200 may perform high-bandwidth digital content protection (HDCP) authentication according to the HDCP protocols in order to prevent copying of content without a license.

Specifically, the source device 100 may encrypt and transmit content to the sink device 200 according to a previously stored key select vector of host device (AKSV), and the sink device 200 may decrypt and output the content according to previously stored key select vector of display device (BASV).

Each device 100 and 200 may generate pseudo-random values at a preset time, e.g., pseudo-random value generated by the source device 100 is $R_i$ and pseudo-random value generated by the sink device 200 is $R_i'$. Further, the source device 100 may receive the pseudo-random value generated by the sink device 200, from the sink device 200, during a certain period, and may determine whether the received value may be uniform with pseudo-random value generated internally.

Therefore, the source device 100 may continuously transmit content to the sink device 200 when it is determined that pseudo-random values are uniform, and stop transmitting content when it is determined that pseudo-random values are not uniform.

In order to perform HDCP authentication as described above, two operations may be done as follows. The first operation that may be performed may be a first part of an authentication protocol in which it is determined whether the source device 100 and the sink device 200 are proper for protecting content with each other, which is confirmed by generating and comparing initial pseudo-random values. Next, the second operation that may be performed is a third part of authentication protocol in which pseudo-random values generated by both devices are compared continuously thereafter, e.g., every two seconds.

According to such operations, the source device 100 and the sink device 200 may perform HDCP authentication according to the HDCP protocol.

According to an exemplary embodiment, the source device 100 may encrypt and transmit content to the sink device 200 by considering the HDCP version supported by the sink device 200.

The following will specifically explain detailed composition of the source device 100 and the sink device 200.

Figure 2:
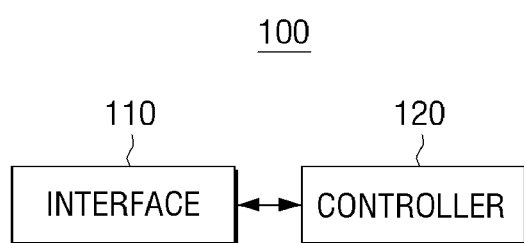
FIG. 2 is a block diagram of a source device according to an exemplary embodiment.

FIG. 2 is a block diagram of the source device according to an exemplary embodiment. Referring to FIG. 2, the source device 100 may include an interface 110 and a controller 120.

The interface 110 may transmit content to the sink device 200 by performing communication with the sink device 200 of FIG. 1.

In this case, the interface 110 may perform HDCP authentication with the sink device 200.

The interface 110 may be implemented as HDMI. Specifically, the interface 110 may include a transition-minimized differential signaling (TMDS) channel link which R, G, B signals and clock signals are approved, DDC communication line for dual way I²C communication, and pin connected with HPD sensing line to sense an HDMI connection. Further, the interface 110 may include a memory storing AKSV, and an engine performing authentication according to the HDCP protocol.

Therefore, when it is determined that the sink device 200 connects according to HPD signals, the interface 110 may perform HDCP authentication with the sink device 200. Further, the interface 110 may encrypt and transmit content to the sink device 200 if HDCP authentication is successful, and stop transmitting content if HDCP authentication fails.

The controller 120 may control general operation of the source device 100. The controller 120 may include a microcomputer (or microcomputer and central processing unit (CPU)), a random access memory (RAM) for operation of the display apparatus 100, and a read only memory (ROM). In this case, such modules may be implemented as a system on chip (SoC).

The controller 120 may determine the HDCP version which the sink device 200 supports. Herein, the HDCP version may be various versions defined in the HDCP protocol such as HDCP version 1.X (e.g., HDCP version 1.4) and HDCP version 2.X (e.g., HDCP version 2.2).

Further, the controller 120 may determine whether HDCP authentication can be performed with the sink device 200 according to a method defined respectively in the HDCP version supported by the sink device 200 and the HDCP version applied to the content, and confirm the HDCP version supported by the sink device 200. Herein, the HDCP version applied to the content may be various versions defined in the HDCP protocol such as HDCP version 1.X (e.g., HDCP version 1.4) and HDCP version 2.X (e.g., HDCP version 2.2).

For example, assuming that the HDCP version applied to the content is HDCP version 2.2 and the HDCP version supported by the sink device 200 is HDCP version 1.4. In this case, the controller 120 may determine whether HDCP authentication can be performed according to HDCP version 1.4 by controlling the interface 110 to perform HDCP authentication with the sink device 200 according to a method defined in HDCP version 1.4. Therefore, the controller 120 may determine that the sink device 200 supports HDCP version 1.4 if HDCP authentication can be performed with the sink device 200 according to HDCP version 1.4, and may determine that the sink device 200 does not support HDCP version 1.4 if HDCP authentication cannot be performed according to HDCP version 1.4.

Likewise, the controller 120 may determine whether HDCP authentication can be performed according to HDCP version 2.2 by controlling the interface 110 to perform HDCP authentication with the sink device 200 according to a method defined in HDCP version 2.2. Therefore, the controller 120 may determine that the sink device 200 supports HDCP version 2.2 if HDCP authentication can be performed according to HDCP version 2.2, and may determine that the sink device does not support HDCP version 2.2 if HDCP authentication cannot be performed according to HDCP version 2.2.

Therefore, the controller 120 may assume that the sink device 200 supports HDCP version 1.4 or HDCP version 2.2, determine whether HDCP authentication can be performed with the sink device 200 according to each HDCP version, and confirm HDCP version supported by the sink device 200 according to which is actually supported.

Further, the controller 120 may request transmitting previously stored information regarding the HDCP version in the sink device 200, and determine HDCP version supported by the sink device 200 based on the received information of the HDCP version.

For the above operation, the sink device 200 may store information regarding the HDCP version of its own as extended display identification data (EDID). In this case, the controller 120 may determine the HDCP version supported by the sink device 200 by receiving EDID from the sink device 200 with DDC communication line.

Further, the sink device 200 may store information regarding the HDCP version supported in its own RAM. In this case, the controller 120 may determine the HDCP version supported by the sink device 200 by receiving information regarding the HDCP version from the sink device 200.

When it is determined that the HDCP version applied to the content is not supported by the sink device 200, the controller 120 may convert the content so as to be encrypted in an HDCP version supported by the sink device 200, encrypt the converted content to HDCP version supported by the sink device 200, and control the interface 110 to transmit to the sink device 200.

Herein, content may be premium content to be encrypted in a first HDCP version. However, the HDCP version supported by the sink device 200 may be a second HDCP version which is lower than the first HDCP version. For example, content may be premium content to be encrypted in HDCP version 2.X, and HDCP version supported by the sink device 200 may be HDCP version 1.X.

For the above, the controller 120 may determine the HDCP version applied to the content. Specifically, the controller 120 may determine the HDCP version applied to content based on whether content is premium content or not.

Herein, premium content is content requested for hard protection such as 4 k content, 3D content in full HD, and sealed content, and the HDCP protocol defines that HDCP version 2.X is applied to premium content.

Therefore, the controller 120 may determine whether content is premium content or not based on resolution and type of content, or determine whether content is premium content or not by extracting information indicating whether corresponding content is premium content from packet header constituting content.

Further, the controller 120 may determine whether content is premium content or not based on a user command. For example, when a user command indicating that content is premium content is inputted, the controller 120 may determine that corresponding content is premium content.

Thus, when it is determined that content is premium content, the controller 120 may determine that the HDCP version applied to content is HDCP version 2.X.

When it is determined that content is premium content to which HDCP version 2.X is applied while HDCP version supported by the sink device 200 is HDCP version 1.X, the controller 120 may convert content so as to be encrypted in the HDCP version that the sink device 200 supports.

Specifically, the controller 120 may convert content so as to be encrypted in the HDCP version supported by the sink device 200 by reducing resolution of content through downscaling. For this process, the source device 100 may include a scaler.

The reason why HDCP protocol defines that HDCP version 2.X is applied to 4 k content is that content having high original resolution such as 4 k content should be protected with a harder method. Therefore, when resolution of 4 k content decreases by downscaling, HDCP version 2.X should not necessarily be applied even if following the HDCP protocol.

Thus, the controller 120 may control reducing resolution of content by downscaling, performing HDCP authentication with the sink device 200 in HDCP version supported by the sink device 200 regarding content having the reduced resolution, and encrypting and transmitting content.

When following the HDCP protocol, premium content should be applied with HDCP version 2.X. However, when the sink device does not support HDCP version 2.X, the source device cannot perform HDCP authentication with the sink device according to HDCP version 2.X applied to premium content. Therefore, users of the sink device that does not support HDCP version 2.X cannot view premium content provided from the source device.

However, according to an exemplary embodiment, because the source device 100 reduces resolution of premium content so that HDCP version supported by the sink device 200 can be applied, the source device 100 can keep compatibility with the sink device 200 that does not support HDCP version 2.X applied to premium content.

For example, assume that HDCP version supported by the sink device 200 is HDCP version 1.4, and content is 4 k content to which HDCP version 2.2 is applied.

In this case, the controller 120 may downscale 4 k content having resolution of 3840×2160 to be resolution of 1920×1080. Thereby, because HDCP version 2.2 should not necessarily be applied to content having the reduced resolution of 1920×1080, the controller 120 may perform authentication with the sink device 200 according to HDCP version 1.4 supported by the sink device 200, encrypt the downscaled content, and transmit to the sink device 200.

The above exemplary embodiment describes 4 k content; however, this is merely one of the possible exemplary embodiments. Thus, as well as 4 k content, the controller 120 may control reducing resolution of 3D content in full HD and sealed content so that HDCP version supported by the sink device can be applied.

Further, the above exemplary embodiment describes that resolution of content is reduced; however, this is also merely one of the possible exemplary embodiments. Thus, as well as reducing resolution of content through downscaling, the controller 120 may reprocess content so that HDCP version supported by the sink device can be applied. For example, when both HDCP version 1.X and HDCP version 2.X can be applied to content, and the sink device 200 supports HDCP version 1.X, the controller 120 may encrypt content according to HDCP version 1.X without separate converting and transmit to the sink device 200. However, this is merely one of the possible exemplary embodiments; the controller 120 may also reprocess content according to various methods such as modifying data format so that HDCP version supported by the sink device can be applied, encrypt the reprocessed content according to HDCP version supported by the sink device, and transmit to the sink device.

When it is determined that the HDCP version applied to content is supported by the sink device 200, the controller 120 may encrypt content in HDCP version applied to content, and transmit to the sink device 200. Thus, when it is determined that HDCP version 2.X applied to premium content is supported by the sink device 200, the controller 120 may perform authentication with the sink device 200 according to HDCP version 2.X without separate processing, encrypt the content, and transmit to the sink device 200.

The controller 120 may downscale premium content by using related methods. However, considering the point that resolution of content can be reduced in this case, the controller 120 may downscale premium content by using the method illustrated in FIG. 3.

The controller 120 may downscale each frame constituting premium content into four frames constituted with lower frames. Specifically, the controller 120 generates a first frame by extracting pixels at odd series of horizontal and vertical lines in each frame of the premium content, generates a second frame by extracting pixels at even series of horizontal lines and odd series of vertical lines in each frame of the premium content, generates a third frame by extracting pixels at odd series of horizontal lines and even series of vertical lines in each frame of the premium content, and generates a fourth frame by extracting pixels at even series of horizontal and vertical lines in each frame of the premium content.

Figure 3:
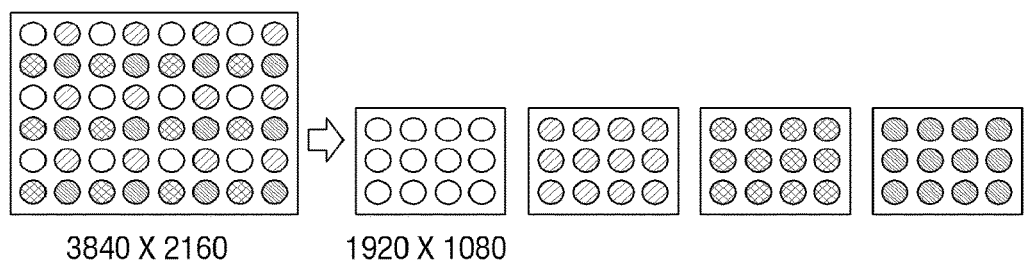
FIG. 3 is a view provided to explain a content downscaling method according to an exemplary embodiment.

For example, the controller 120 may downscale each frame of 4 k content having resolution of 3840×2160 into four frames having resolution of 1920×1080 as illustrated in FIG. 3.

Further, the controller 120 may encrypt the downscaled content in the HDCP version supported by the sink device 200 and transmit to the sink device 200. In this case, the sink device 200 may receive the downscaled content, restore original resolution that premium content has and output. Therefore, a user can view content without deteriorating in resolution.

In case converted content is transmitted to the sink device 200, the controller 120 may control the sink device 200 to output a message informing that content is converted.

Thus, when the source device 100 reduces resolution of premium content and transmit to the sink device 200 by considering the HDCP version supported by the sink device 200, a user may view content having deteriorated resolution compared to original resolution.

Therefore, the controller 120 may control the sink device 200 to output a message informing that content having the reduced resolution is outputted, and thus, can inform a user of outputting content having the reduced resolution. In this case, the controller 120 may transmit graphic data constituted with a corresponding message to the sink device 200, or a controlling command to output graphic data previously stored in the sink device 200 to the sink device 200.

As described above, when it is determined that the HDCP version applied to content is not supported by the sink device 200, the controller 120 may convert content so as to be automatically encrypted in HDCP version supported by the sink device 200 without a separate user command, and transmit to the sink device 200. However, when a separate user command is inputted, the controller 120 may convert content into the HDCP version supported by the sink device 200 and transmit to the sink device 200.

Further, the controller 120 may control the sink device 200 to output a message informing that content cannot be outputted. Thus, when it is determined that the HDCP version applied to content is not supported by the sink device 200, the controller 120 may transmit graphic data constituted with a message informing that content cannot be outputted to the sink device 200 without converting content so as to be encrypted in the HDCP version supported by the sink device 200. Further, the controller 120 may transmit a controlling command to output graphic data previously stored in the sink device 200 to the sink device 200.

Figure 4:
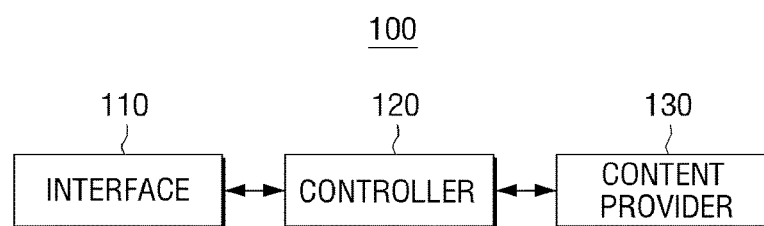
FIG. 4 is a detailed block diagram of the source device according to an exemplary embodiment.

FIG. 4 is a detailed block diagram of the source device according to an exemplary embodiment. Referring to FIG. 4, the source device 100 may further include a content provider 130 as well as the interface 110 and the controller 120. The content provider 130 may be controlled by the controller 120. Among the units illustrated in FIG. 4, an overlapping part with the units illustrated in FIG. 1 will not be described herein.

The content provider 130 may provide content transmitted to the sink device 200, and may be implemented as various types according to exemplary embodiments.

For example, the content provider 130 may be implemented to include a tuner, a demodulator, and a lighter, and may receive broadcasting content transmitted from broadcasting stations. Further, the content provider 130 may read content recorded on an optical disc such as DVD and Blu-ray disc. The content provider 130 may receive content from external recording medium such as a USB memory and a HDD.

Thereby, the controller 120 may control transmitting content delivered from the content provider 130 to the sink device 200 by considering the HDCP version supported by the sink device 200.

As well as the units illustrated in FIG. 4, the source device 100 may further include a storage storing various programs used for operating the source device 100, an inputter to receive a user command, and a remote controller signal receiver to receive remote controller signals corresponding to a user command.

Figure 5:
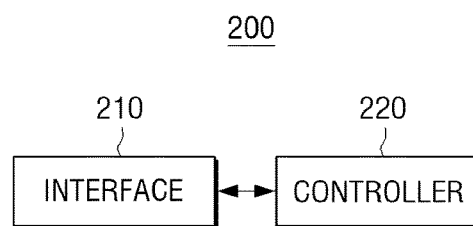
FIG. 5 is a block diagram of a sink device according to an exemplary embodiment.

FIG. 5 is a block diagram of a sink device according to an exemplary embodiment. Referring to FIG. 5, the sink device 200 may include an interface 210 and a controller 220.

The interface 210 may receive content from the source device 100 by performing communication with the source device 100 of FIG. 1.

In this case, the interface 210 may perform HDCP authentication with the source device 100.

For the above, the interface 210 may be implemented as HDMI. Specifically, the interface 210 may include TMDS channel link which R, G, B signals and clock signals are approved, DDC communication line with dual way for I²C communication, and pin connected with HPD sensing line to sense an HDMI connection. Further, the interface 210 may include a memory to store BKSV, and a HDCP engine to perform authentication according to HDCP protocol.

Therefore, when it is determined that the source device 100 connects according to HPD signals, the interface 210 may perform HDCP authentication with the source device 100. Further, the interface 210 may receive the encrypted content from the source device 100 when HDCP authentication is successful, and decrypt the received content; however, when HDCP authentication fails, content cannot be received.

The controller 220 controls general operation of the sink device 200. The controller 220 may include a microcomputer (micom) (or, a micom and a CPU), RAM for operation of the display apparatus 100, and ROM. In this case, such modules may be implemented as a SoC.

When a request for information regarding the HDCP version supported by the sink device 200 is received from the source device 100, the controller 220 controls the interface 210 to transmit prestored information regarding the HDCP version supported by the sink device 200 to the source device 100.

For the above, the sink device 200 may previously store EDID which includes information regarding the HDCP version that is supported. Thus, the sink device 200 may previously store EDID which includes information regarding the HDCP version as well as information regarding manufacturer ID indicating manufacturing company, manufacturing ID indicating model type of a product, image and audio output standards of the sink device 200.

Further, the sink device 200 may separately store information regarding the HDCP version supported in its own on RAM.

For example, when it is determined that the source device 100 connects according to HPD signals, the controller 220 may transmit EDID including information regarding the HDCP version to the source device 100, or transmit information regarding the HDCP version stored in RAM to the source device 100. However, if a separate transmitting request is received from the source device 100, the controller 220 may transmit information regarding the HDCP version to the source device 100.

Figure 6:
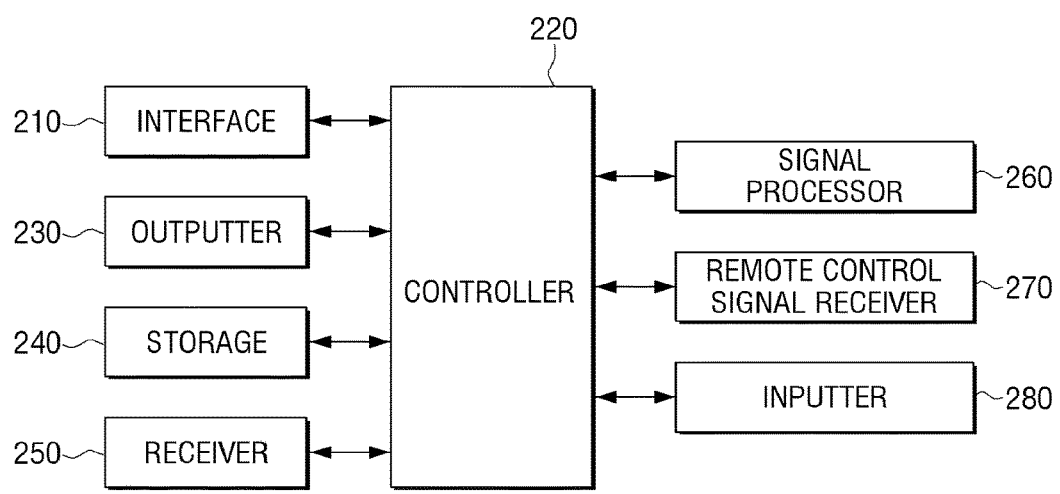
FIG. 6 is a detailed block diagram of the sink device according to an exemplary embodiment.

FIG. 6 is a detailed block diagram of the sink device according to an exemplary embodiment. Referring to FIG. 6, the sink device 200 may further include an outputter 230, a storage 240, a receiver 250, a signal processor 260, a remote controller signal receiver 270 and an inputter 280 as well as the interface 210 and the controller 220. Such operation may be controlled by the controller 220. Among the units illustrated in FIG. 6, an overlapping part with the units illustrated in FIG. 4 will not be further described.

The outputter 230 may output various image and audio data. For this operation, the outputter 230 may include a display and an audio outputter.

The display may display image regarding content and the audio outputter may output audio regarding content. For example, when content is received from the source device 100 by successfully performing HDCP authentication, the controller 220 may decrypt the received content, display image regarding the decrypted content on the display, and output audio regarding the content through the audio outputter.

The display may be implemented as liquid crystal display (LCD), organic light emitting display (OLED), or plasma display panel (PDP), and the audio outputter may be implemented as speaker or audio output port.

The display may output various messages in on screen display (OSD) format. Specifically, the controller 220 may generate various messages in OSD format by using graphic data which are received from the source device 100 or previously stored in the sink device 200, and output the generated messages through the display. Herein, messages may include a message indicating that resolution of content received from the source device 100 changes, and a message indicating that content cannot be outputted.

The storage 240 may store various programs used for operation of the sink device 200.

Specifically, the storage 240 may store information regarding the HDCP version supported by the sink device 200 in EDID format. For this operation, the storage 240 may be implemented as flash memory, and electrically erasable and programmable ROM (EEPROM).

Therefore, when a transmitting request for information regarding HDCP version is received from the source device 100, the controller 230 may control reading EDID from the storage 240 and transmitting to the source device 100.

The receiver 250 may receive broadcasting content. Broadcasting content may include image, audio, and additional data (e.g., EPG), and the receiver 250 may receive broadcasting content from various sources such as ground wave broadcasting, cable broadcasting, satellite broadcasting, and internet broadcasting.

For example, the receiver 250 may be implemented to include a tuner, a demodulator, and a lighter in order to receive broadcasting content transmitted from broadcasting stations.

The signal processor 260 may perform signal-processing regarding content received through the interface 210 and the receiver 250. Specifically, the signal processor 260 may perform operations such as decoding, scaling, and frame rate converting regarding image constituting content, and signal-process the content so as to be formatted such that it can be outputted on the display.

The remote control signal receiver 270 receives remote control controlling signals inputted through a remote control. For example, the remote control signal receiver 270 may receive remote control controlling signals corresponding to various user commands in order to control operation of the sink device 200, and the controller 220 may perform operation corresponding to the received remote control controlling signals.

The inputter 280 may receive various user commands. The controller 220 may perform operation corresponding to user commands inputted by the inputter 280. For this process, the inputter 280 may be implemented as an inputting panel. The inputting panel may be implemented with a touch pad, or a key pad provided with various function keys, number keys, special keys, and character keys, or a touch screen.

Figure 7:
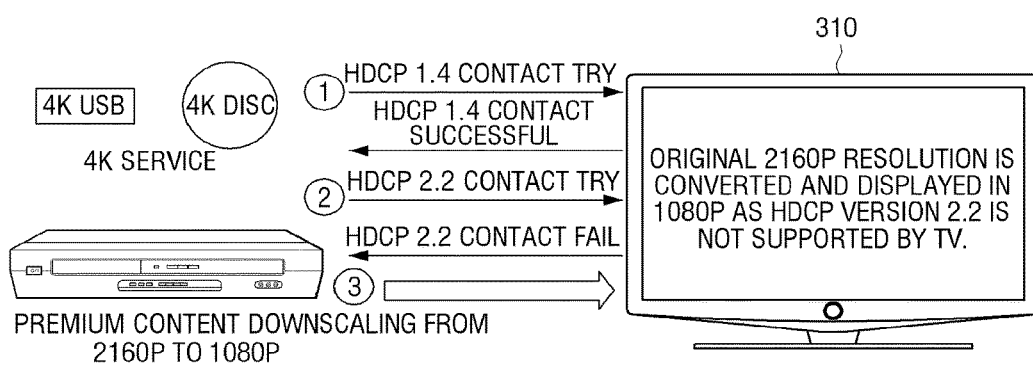
FIG. 7 is a view provided to explain operation of the content providing system according to an exemplary embodiment.

FIG. 7 is a view provided to explain operation of the content providing system according to an exemplary embodiment. Specific operation of the source device 100 and the sink device 200 is already described in detail with reference to FIGS. 1 through 6; operation of such composition will be briefly explained.

Referring to FIG. 7, the source device 100 receives premium content (e.g., 4 k content) from broadcasting stations, optical disc, and/or USB.

Further, the source device 100 determines information regarding the HDCP supported by the sink device 200.

Specifically, the source device 100 determines whether HDCP authentication can be performed with the sink device 200 according to a method defined in HDCP version 1.4 (see ① of FIG. 7), and determines whether HDCP authentication can be performed with the sink device 200 according to a method defined in HDCP version 2.2 (see ② of FIG. 7).

As a determining result, when it is determined that HDCP authentication can be performed with the sink device 200 according to a method defined in HDCP version 1.4, from among HDCP version 1.4 and HDCP version 2.2, the source device 100 determines that the sink device 200 supports HDCP version 1.4.

Therefore, the source device 100 downscales premium content in order to encrypt premium content in HDCP version 1.4, and to transmit to the sink device 200. For example, the source device 100 may downscale 4 k content having resolution of 2160×3840 to be resolution of 1920×1080.

Thereafter, the source device 100 may perform HDCP authentication according to HDCP version 1.4 with the sink device 100, encrypt the downscaled content in HDCP version 1.4, and transmit to the sink device 200.

Thus, the sink device 200 may decrypt and output the received content from the source device 100. In this case, the sink device 200 may output a message 310 indicating that content having the reduced resolution is being outputted in OSD format.

Figure 8:
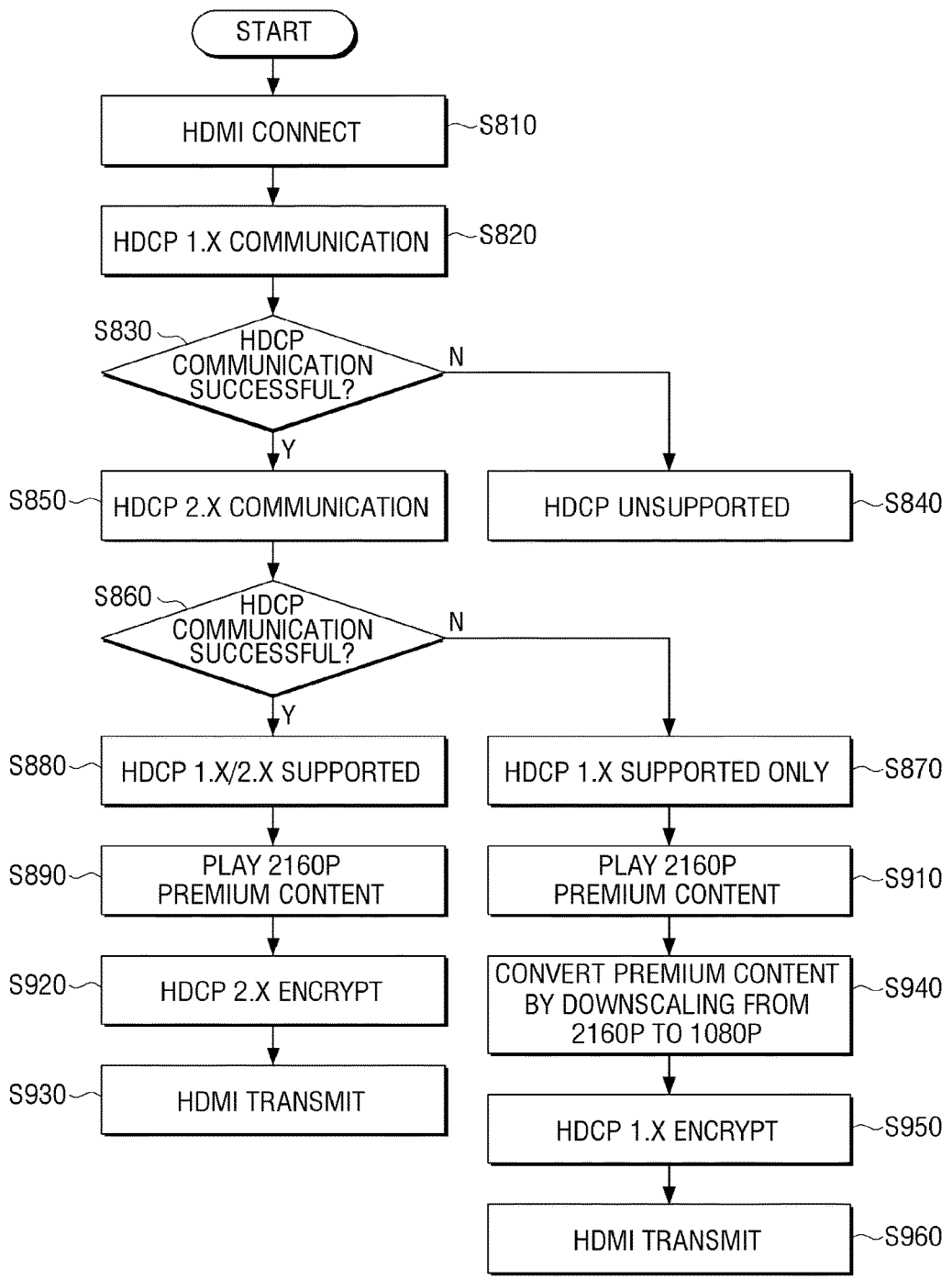
FIG. 8 is a flowchart provided to explain operation of the content providing system according to an exemplary embodiment.

FIG. 8 is a flowchart provided to explain operation of the content providing system according to an exemplary embodiment.

First, when the source device 100 and the sink device 200 connect to each other according to an HDMI communication method at S810, the source device 100 and the sink device 200 perform connecting communication according to a method defined in HDCP version 1.4 at S820. Thus, the source device 100 and the sink device 200 determine whether HDCP authentication can be performed according to a method defined in HDCP version 1.4.

At S830, the source device 100 determines whether communication in HDCP version 1.4 is supported and then connects.

However, when connecting communication following the HDCP version 1.4 fails, the source device 100 may determine that the sink device 200 does not support HDCP version 1.4 at S840.

When connecting communication following the HDCP version 1.4 is successful, the source device 100 may determine that the sink device 200 supports HDCP version 1.4.

At S850 and S860, the source device 100 determines whether communication in HDCP version 2.2 is connected. Thus, the source device 100 determines whether HDCP authentication defined in HDCP version 2.2 can be performed with the sink device 200.

Therefore, when connecting communication following HDCP version 2.2 fails, the source device 100 may determine that the sink device 200 does not support HDCP version 2.2. As a result, the source device 100 may determine that the sink device 200 supports HDCP version 1.4 only at S870.

When connecting communication following HDCP version 2.2 is successful, the source device 100 may determine that the sink device 200 supports HDCP version 2.2. As a result, the source device 100 may determine that the sink device 200 supports both HDCP version 1.4 and HDCP version 2.2 at S880.

When a command to play premium content is inputted at S890 and S910, the source device 100 may encrypt premium content according to a version supported by the sink device 200 and transmit to the sink device 200.

Specifically, when it is determined that HDCP version 2.2 is supported by the sink device 200, the source device 100 may encrypt premium content in HDCP version 2.2 at S920 and transmit to the sink device 200 through HDMI at S930.

When it is determined that the sink device 200 does not support HDCP version 2.2 but rather only HDCP version 1.4, the source device 100 may downscale premium content at S940, encrypt the downscaled content in HDCP version 1.4 at S950, and transmit to the sink device 200 through HDMI at S960.

Figure 9:
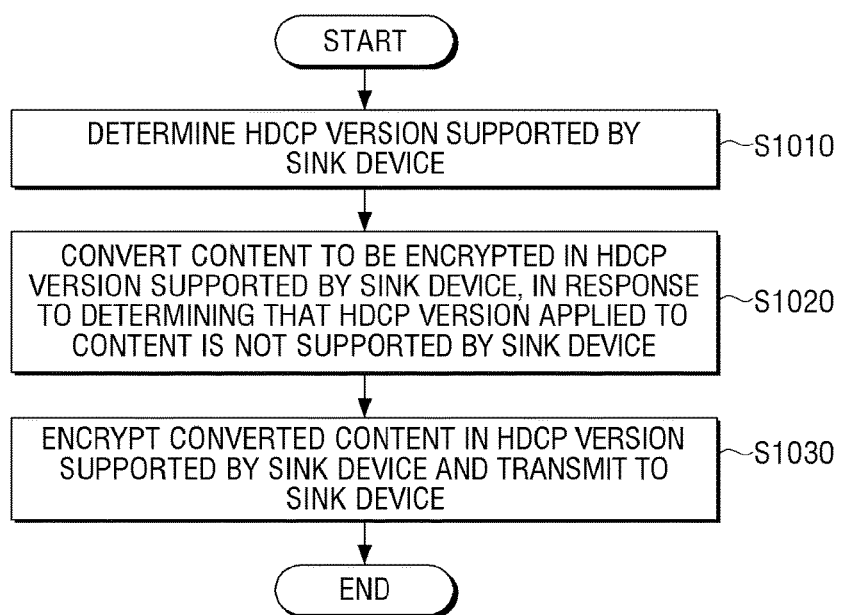
FIG. 9 is a flowchart provided to explain a content transmitting method of the source device which transmits content to the sink device according to an exemplary embodiment.

FIG. 9 is a flowchart provided to explain a content transmitting method of the source device which transmits content to the sink device according to an exemplary embodiment.

First, HDCP version supported by the sink device is determined at S1010.

Specifically, HDCP version supported by the sink device may be determined based on whether HDCP authentication can be performed with the sink device according to a method respectively defined in HDCP version supported by the sink device and HDCP version applied to content.

Further, a request for information regarding the HDCP version previously stored in the sink device, and the HDCP version supported by the sink device, may help determine the received information regarding the HDCP version from the sink device.

When it is determined that the HDCP version applied to content is not supported by the sink device, content is converted so as to be encrypted in HDCP version supported by the sink device at S1020.

Herein, content may be premium content that may need to be encrypted in the first HDCP version, and HDCP version supported by the sink device may be the second HDCP version which may be lower than the first HDCP version.

Specifically, content may be converted so as to be encrypted in the HDCP version supported by the sink device by reducing resolution of content through downscaling.

At S1030, the converted content is encrypted in the HDCP version supported by the sink device and transmitted to the sink device.

When it is determined that the HDCP version applied to content is supported by the sink device, the content may be encrypted in the HDCP version applied to content and transmitted to the sink device.

Further, when the converted content is transmitted to the sink device, the sink device may be controlled to output a message indicating that content is converted. Further, the sink device may be controlled to output a message indicating that content cannot be outputted.

Figure 10:
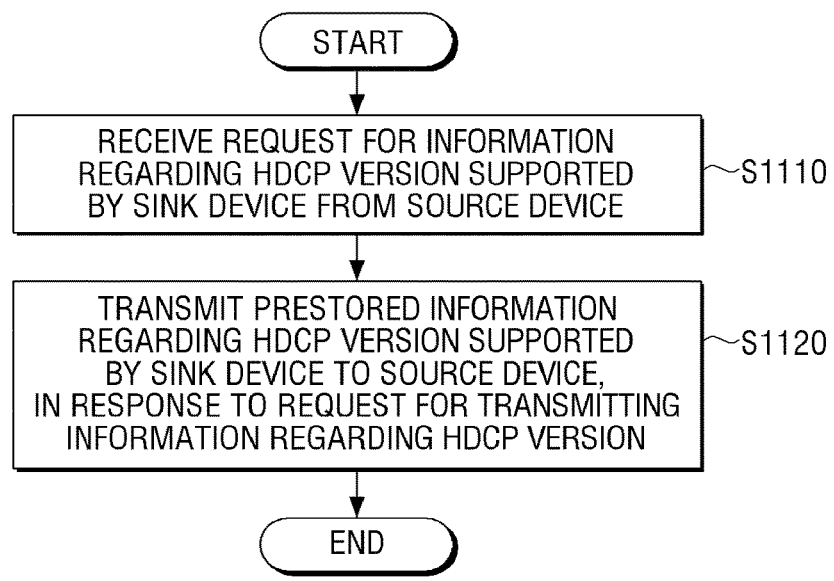
FIG. 10 is a flowchart provided to explain a controlling method of the sink device which outputs content provided from the source device according to an exemplary embodiment.

FIG. 10 is a flowchart provided to explain a controlling method of the sink device which outputs content provided from the source device according to an exemplary embodiment.

At S1110, from the source device, may be received a request for information regarding the HDCP version supported by the sink device.

When a request for transmitting information regarding the HDCP version is received, previously stored information regarding the HDCP version supported by the sink device may be transmitted to the source device at S1120.

For this process, the sink device may store information regarding the HDCP version supported by the sink device in EDID format.

Further, there may be provided non-transitory computer readable medium storing programs which consecutively implement a menu content providing method and a controlling method according to an exemplary embodiment.

Non-transitory computer readable recording medium may indicate medium which store data semi-permanently and can be read by devices, not medium storing data temporarily such as register, cache, or memory. Specifically, the above various applications or programs may be stored and provided in non-transitory computer readable recording medium such as CD, DVD, hard disk, Blu-ray disc, USB, memory card, or ROM.

Further, although the above block diagrams describing the source device and the sink device do not illustrate a bus, communication between units in the display apparatus can be performed through the bus. Further, processors such as CPU implementing the above various operation and a microprocessor may be provided in each device.

According to the above various exemplary embodiments, even if the sink device supports different version from HDCP version applied to content, the source device may provide content in HDCP version supported by the sink device to the sink device through content converting. Therefore, compatibility with related sink devices can be obtained.

Further, the foregoing exemplary embodiments and advantages are merely exemplary and are not to be construed as limiting the exemplary embodiments. The present teaching can be readily applied to other types of apparatuses. Also, the description of the exemplary embodiments are intended to be illustrative, and not to limit the scope of the claims.

What is claimed is:

1. A blu-ray disc player for transmitting content to a display device, the blu-ray disc player comprising:
   an interface; and
   a controller configured to:
      receive information from the display device,
      identify a high-bandwidth digital content protection (HDCP) version supported by the display device based on the received information,
      encrypt a content in one of different HDCP versions based on the identified HDCP version supported by the display device, and
      control the interface to transmit the encrypted content to the display device,
      wherein the controller is configured to encrypt the content in one of the different HDCP versions based on the identified HDCP version by:
         encrypting the content in a first HDCP version based on the identified HDCP version being the first HDCP version, and
         downscaling the content and encrypting the downscaled content in a second HDCP version, based on the identified HDCP version not being the first HDCP version.

2. The blu-ray disc player of claim 1, wherein the second HDCP version is lower than the first HDCP version.

3. The blu-ray disc player of claim 1, wherein the information is in an extended display identification data (EDID) format.

4. The blu-ray disc player of claim 1, wherein the controller is configured to control the display device to output a message indicating that the content is downscaled in response to the content encrypted in the second HDCP version being transmitted to the display device.

5. The blu-ray disc player of claim 1, wherein the content comprises at least one of image data and audio data.

6. A method of transmitting content from a blu-ray disc player to a display device, the method comprising:

receiving information from the display device,
identifying a high-bandwidth digital content protection (HDCP) version supported by the display device based on the received information;
encrypting a content in one of different HDCP versions based on the identified HDCP version supported by the display device; and
transmitting the encrypted content to the display device,
wherein the encrypting comprises:
encrypting the content in a first HDCP version based on the identified HDCP version being the first HDCP version, and
downscaling the content and encrypting the downscaled content in a second HDCP version, based on the identified HDCP version not being the first HDCP version.

7. The method of claim 6, wherein the second HDCP version is lower than the first HDCP version.

8. The method of claim 6, wherein the information is in an extended display identification data (EDID) format.

9. The method of claim 6, further comprising:
controlling the display device to output a message indicating that the content is downscaled in response to the content encrypted in the second HDCP version being transmitted to the display device.

10. The method of claim 6, wherein the content comprises at least one of image data and audio data.

11. A system for processing high-bandwidth digital content protection (HDCP) content, the system comprising:
a display device comprising at least one processor configured to:
receive an encrypted content, and
decrypt and display the encrypted content; and
a blu-ray disc player comprising at least one processor configured to:
receive information from the display device,
identify an HDCP version supported by the display device based on the received information,
encrypt a content in one of different HDCP versions based on the HDCP version supported by the display device, and
transmit the encrypted content to the display device,
wherein the at least one processor of the blu-ray disc player is further configured to:
encrypt a content in a first HDCP version based on the HDCP version being the first HDCP version, and
downscaling the content and encrypt the downscaled content in a second HDCP version, based on the HDCP version not being the first HDCP version.

12. A method of processing high-bandwidth digital content protection (HDCP) content, the method comprising:
receiving, by a blu-ray disc player, information from a display device,
identifying, by the blu-ray disc player, a HDCP version supported by the display device based on the received information;
encrypting, by the blu-ray disc player, a content in one of different HDCP versions based on the HDCP version supported by the display device;
transmitting, from the blu-ray disc player, the encrypted content to the display device;
receiving, by the display device, the encrypted content; and
decrypting and displaying, by the display device, the encrypted content,
wherein the encrypting comprises:
encrypting the content in a first HDCP version based on the HDCP version being the first HDCP version, and
downscaling the content and encrypting the downscaled content in a second HDCP version, based on the HDCP version not being the first HDCP version.

\* \* \* \* \*